(12) United States Patent
Choi et al.

(10) Patent No.: US 6,762,402 B2
(45) Date of Patent: Jul. 13, 2004

(54) APPARATUS FOR RECORDING AND READING DATA AND METHOD OF RECORDING AND READING DATA USING CONTACT RESISTANCE MEASUREMENT THEREOF

(75) Inventors: Jae-joon Choi, Kyungki-do (KR); Jong Up Jeon, Kyungki-do (KR); Jung-gyu Shin, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/973,869

(22) Filed: Oct. 11, 2001

(65) Prior Publication Data

US 2002/0066855 A1 Jun. 6, 2002

(30) Foreign Application Priority Data

Dec. 1, 2000 (KR) .......................................... 2000-72596

(51) Int. Cl.[7] .................................................. H01J 3/14
(52) U.S. Cl. .......................................... 250/234; 369/43
(58) Field of Search .............................. 369/43, 53, 41, 369/127, 272, 282; 430/330; 216/52; 250/234

(56) References Cited

U.S. PATENT DOCUMENTS 5,583,286 A   12/1996   Matsuyama
5,732,053 A * 3/1998   Yano et al. ............... 369/53.41
6,181,097 B1 * 1/2001   Li et al. .................... 318/592
6,218,086 B1 * 4/2001   Binnig et al. ............. 430/330
6,477,132 B1 * 11/2002  Azuma et al. ............ 369/126

FOREIGN PATENT DOCUMENTS

JP      A-6-52581       2/1994
JP      A-8-62230       3/1996

* cited by examiner

*Primary Examiner*—Kevin Pyo
*Assistant Examiner*—Seung C. Sohn
(74) *Attorney, Agent, or Firm*—Burns Doane Swecker & Mathis, LLP

(57) ABSTRACT

An apparatus for recording and reading data by measuring contact resistance and a method for recording and reading data thereof are provided. The apparatus for recording and reading data includes a storage medium and a probe which is installed to face the storage medium and is used for recording data on the storage medium and reading the data from the storage medium. The storage medium includes a substrate, a conductive layer formed on the substrate and a dielectric layer formed on the conductive layer. With the apparatus for recording and reading data, it is possible to solve problems concerning data retention, data read speed and signal-to-noise ratio which have been at issue in developing data storage media with the use of conventional scanning probe microscopic techniques.

24 Claims, 9 Drawing Sheets

APPARATUS FOR RECORDING AND READING DATA AND METHOD OF RECORDING AND READING DATA USING CONTACT RESISTANCE MEASUREMENT THEREOF

Priority is claimed to Patent Application No. 00-72596 filed in the Republic of Korea on Dec. 1, 2000, herein incorporated by reference.

BACKGROUND OF THE INVENTION

1. Field of the Invention

The present invention relates to an apparatus for recording and reading data and a method for recording and reading data thereof, and more particularly, to an apparatus for recording and reading data by measuring output voltage variations introduced by contact resistance between a data storage medium and a probe tip.

2. Description of the Related Art

With developments in the scanning probe microscope, it is possible to observe new physical phenomena in terms of various atomic levels. In addition, research on data storage based on the findings observed by scanning probe microscopes has become more active. Until now, in particular, a variety of research efforts into developing data storage media and recording/reading data have been carried out. Mostly, the purpose of such research has been to realize data storage media capable of recording and reading data bits on the order of several nanometers or even to the atomic level with the use of magnetic material, piezo-electric material or charge traps and taking advantage of phase transformation. However, in a case where data storage media are formed of piezo-electric material or charge traps, the media may cause a critical problem with data retention and signals stored in the media are very weak. Thus, in this case, it is necessary to develop a highly sensitive sensing probe capable of reading such data bits of atomic size or on the order of several nanometers.

International Business Machines Corp. has developed a data storage medium formed of polymer. However, this type of medium also has limits in sensitivity and the data read speed, which will be described with reference to FIGS. 1A through 2B.

FIGS. 1A and 1B illustrate the data recording and reading mechanisms of an apparatus for recording and reading data using a conventional polymer medium. Referring to FIG. 1, a tip 11 is heated by current I applied through a cantilever 12 and then, polymer 13 which is a medium is melted by the tip 11, so that a unit of data (e.g., a bit) 15 can be written on the polymer 13. As the polymer 13 becomes thinner, it is possible to write a bit 15 having a smaller size on the polymer 13.

Referring to FIG. 1B, in the case of sensing the polymer 13 with the tip 11 to read data, the tip 11 is also heated by current applied through the cantilever 12 and the heated tip 11 scans the surface of the polymer 13. Here, the temperature of the tip 11 is maintained to such an extent that the polymer 13 does not melt. There is a difference in heat conductivity between scanning the surface of the polymer 13 with the probe and scanning the bottom surface of the bit 15 with the probe. Accordingly, the amount of current flowing at one side of the probe is different from the amount of current flowing at the other side of the probe. Then, the probe reads data by sensing the difference in temperature. In other words, the probe detects a difference in temperature in the case of sensing the polymer 13 and the bit 15. If the bit 15 recorded on the polymer 13 has a greater depth, it is possible to obtain a higher signal-to-noise ratio in reproducing data. As described above, in order to record bits having a smaller size on the polymer 13, the polymer 13 must be formed to be thinner. However, if the polymer 13 is too thin, problems with sensing sensitivity and signal-to-noise ratio may arise. According to the prior art, it is preferable that the thickness of the polymer 13 on the substrate 14 is about 40 nm, however, in a case where polymer 13 having such a thickness is used, an amplification circuit is needed to read weak signals comprised of finely sized bits.

Meanwhile, as it is possible to highly densify data to be recorded in an apparatus for recording and reading data, the amount of data recordable in an apparatus for recording and reading data increases. As a result, it becomes necessary for an apparatus for recording and reading data to read the data at high speeds. The data read speed is related to the natural oscillation frequency of a probe. In a case where a probe reads data by sensing differences in temperature as in the prior art, a thermal time constant may also have an influence on the data read speed. However, in this case, as shown in FIGS. 2A and 2B, it is difficult to obtain clean images. FIG. 2A is a scanning electron micrograph (SEM) image showing bits on a conventional data storage medium and FIG. 2B is a SEM image showing data read by a conventional apparatus for recording and reading data.

Therefore, to solve these problems with the prior art concerning small-sized bits, the data read speed and the signal-to-noise ratio, it is necessary to develop a new apparatus for recording and reading data and a method for recording and reading data thereof.

SUMMARY OF THE INVENTION

To solve the above problems, it is an object of the present invention to provide an apparatus for recording and reading data which is capable of reducing the size of a data unit (or at least width of data units in the case of run-length encoding and the like), enhancing the data read speed, and obtaining a high signal-to-noise ratio and a method for recording and reading data thereof.

Accordingly, to achieve the above object, there is provided an apparatus for recording and reading data comprising: a storage medium on which data is recorded; and a probe which is installed to face the storage medium and is used for recording data on the storage medium and reading the data recorded on the storage medium, wherein the storage medium comprises a substrate; a conductive layer which is formed on the substrate; and a dielectric layer which is formed on the conductive layer wherein said system further comprises a circuit for reading the data, connected between said probe and said conductive layers that determines an output voltage value that varies depending on a portion of said storage medium being scanned by said probe.

Preferably, holes are formed on predetermined portions of the dielectric layer so as to expose the top surface of the conductive layer. Preferably, the dielectric layer is formed of one among the group consisting of an organic material, a polymer, a wax and a liquid crystal, and the conductive layer is formed of one among the group consisting of metal and semiconductor.

Preferably, the substrate is one of a silicon substrate, a glass substrate, and a metal substrate.

The probe comprises a cantilever and a tip fixed on the cantilever. Preferably, the cantilever is formed of one of Si, SiN and dielectric material, the tip is formed of silicon and the surface of the tip is coated with a metal layer.

The probe operates a predetermined distance apart from the storage medium or in contact with the storage medium. The probe further comprises a first contact pad and a second contact pad which are connected to short lines of the cantilever, the short line connected to the first contact pad is in contact with the probe tip and the short line connected to the second contact pad is not in contact with the probe tip.

To achieve the above object, there is provided a method for recording and reading data in an apparatus for recording and reading data comprising a storage medium which comprises a substrate, a conductive layer formed on the substrate and a dielectric layer formed on the conductive layer; and a probe which is installed to face the storage medium and is used for recording data on the storage medium and reading the data recorded on the storage medium, comprising: recording data by forming a hole on a predetermined portion of the dielectric layer to expose the surface of the conductive layer; and reading data by scanning the surface of the storage medium with the probe and sensing the variation of output voltage value caused by contact between the probe and the storage medium storage medium.

The probe comprises a cantilever and a tip fixed on the cantilever. The hole is formed by applying current to the probe to heat the tip and melting the dielectric layer with the heated tip.

Variations in output voltage are caused by a short circuit between the tip and the surface of the conductive layer exposed by the hole in scanning the dielectric layer with the tip and is measured by a voltmeter included in the apparatus for recording and reading data.

To achieve the above object, there is provided a method for recording and reading data in an apparatus for recording and reading data comprising a storage medium which comprises a substrate and a conductive layer formed on the substrate; and a probe which is installed to face the storage medium and is used for recording data on the storage medium and reading the data recorded on the storage medium, comprising: recording data by forming a hole on a predetermined portion of the conductive layer to expose the surface of the conductive layer; and reading data by scanning the surface of the storage medium with the probe and sensing variations in the output value caused by contact between the probe and the storage medium.

The hole is formed by applying current to the probe to heat the tip and melting the dielectric layer with the heated tip. If the tip encounters the hole during scanning of the conductive layer, at which the tip and the conductive layer are shorted by each other, output voltage is reduced to 0 V around the hole and variations in output voltage is measured by a voltmeter included in the apparatus for recording and reading data.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The present invention now will be described more fully with reference to the accompanying drawings, in which preferred embodiments of the invention are shown.

Figure 1A:
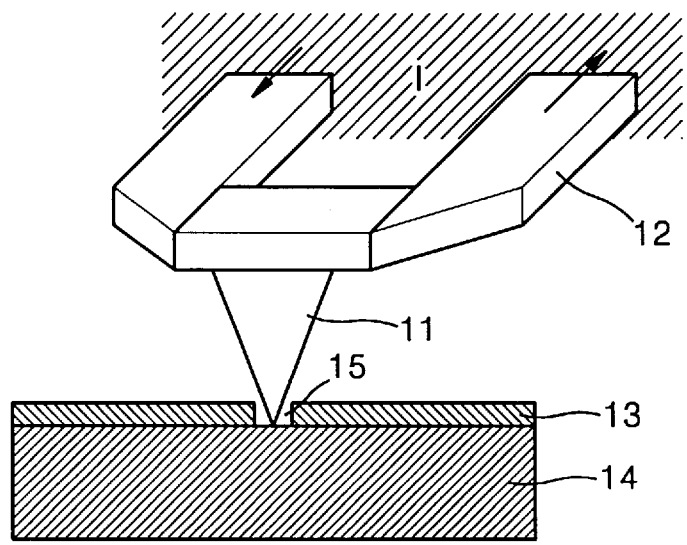
FIG. 1A is a diagram illustrating a method of recording data in a conventional apparatus for recording and reading data.
Figure 1B:
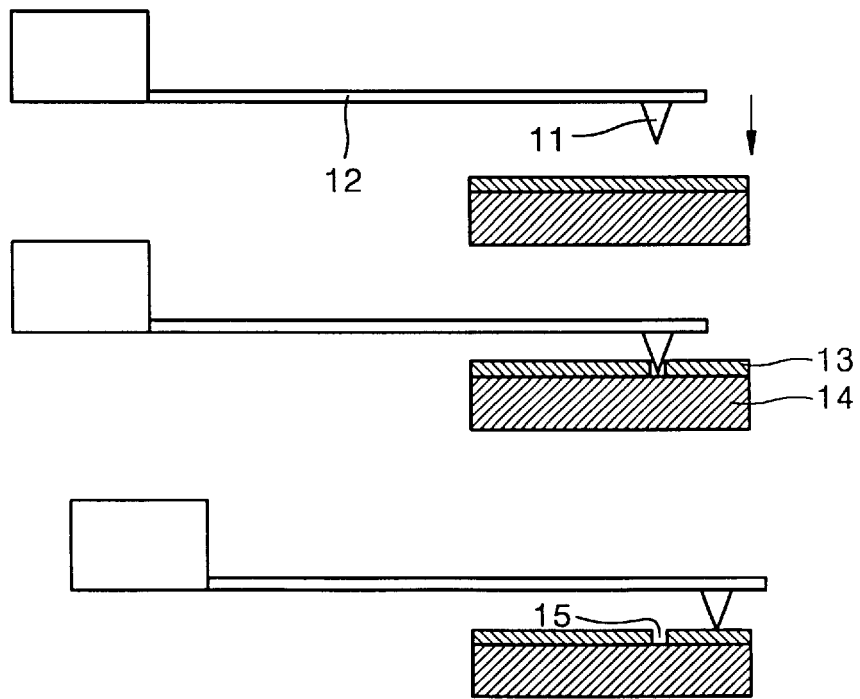
FIG. 1B is a diagram illustrating a method of reading data in a conventional apparatus for recording and reading data.
Figure 2A:
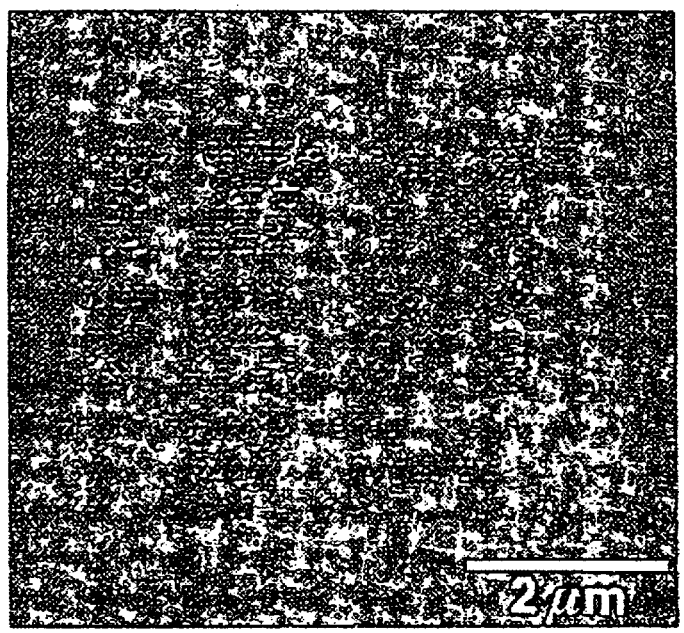
FIG. 2A is a scanning electron micrograph (SEM) image showing bits on a conventional data storage medium.
Figure 2B:
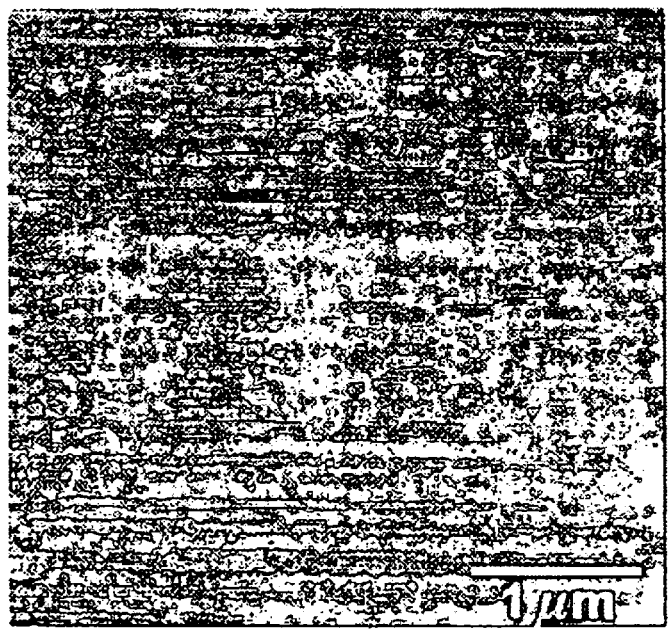
FIG. 2B is a SEM image showing data read by a conventional apparatus for recording and reading data.
Figure 3A:
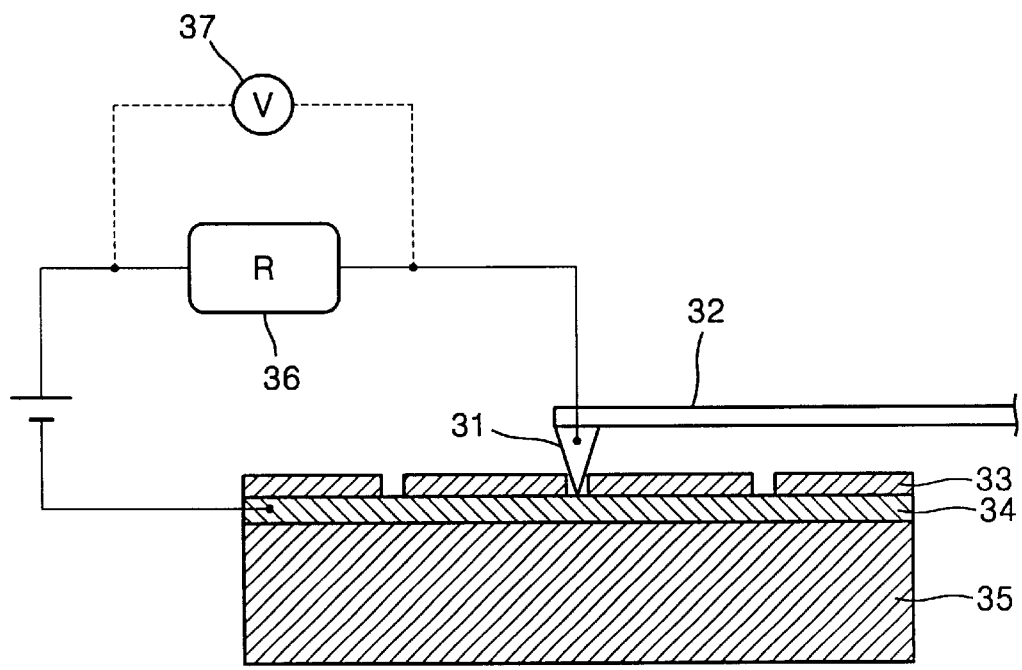
FIGS. 3A and 3B are diagrams illustrating the operational mechanism of an apparatus for recording and reading data according to the present invention.

Referring to FIG. 3A, which illustrates the structure and operational principle of an apparatus for recording and reading data according to a first embodiment of the present invention, a conductive layer 34 is formed on a substrate 35. Preferably, the conductive layer 34 is formed of a metal layer or a semiconductor layer. A dielectric layer 33 is formed on the conductive layer 34. The apparatus for recording and reading data in FIG. 3A is different from the prior art shown in FIG. 1 in that the conductive layer 34 exists between the substrate 35 and the dielectric layer 33. The substrate 35 may be a silicon substrate, a glass substrate, or a metal substrate.

As described above, the conductive layer 34 is preferably formed of a metal layer or a conductive semiconductor layer and it may be formed of material that does not oxidize easily, such as gold (Au). The dielectric layer 33 acts as an insulator for preventing short circuits between a tip 31 and the conductive layer 34 and is formed of an organic material, a polymer, wax or a liquid crystal.

The data recording and reading processes of an apparatus for recording and reading data according to the present invention will be described with reference to FIG. 3A. Referring to FIG. 3A again, the data storage medium includes the substrate 35, the conductive layer 34 formed on the substrate 35 and the dielectric layer 33 formed on the conductive layer. To record data on the data storage medium, current is applied to a metal electrode of the cantilever 32 and then, a silicon tip 31 having a relatively high resistance is heated. Desired portions of the dielectric layer 33, that is, the polymer are heated using the heated silicon tip 31 and then, the heated portions on the dielectric layer 33 are melted. As a result, a hole 38 which exposes the surface of the conductive layer 34 is formed at the melted portions on the dielectric layer 33. The hole 38 is used as one data bit.

The data reading process of the apparatus for recording and reading data according to the present invention is as follows. The silicon tip 31 coated with a metal layer scans the surface of the dielectric layer 33, that is, polymer. If the silicon tip 31 encounters the hole 38 formed at a predetermined portion on scanning the surface of the dielectric layer 33, the silicon tip 31 falls into the hole 38. At this time, a short circuit occurs between the tip 31 and the conductive layer 34 formed of either metal or semiconductor. As illustrated in FIG. 3A, there is an outer resistor 36. In this case, due to the short circuit occurred between the tip 31 and the conductive layer 34, the output voltage varies significantly and the variation in output voltage is read by an outer voltmeter 37, thereby reading a data bit of several nanometers. In other words, this method of reading data uses an output voltage value which varies depending on portions to be scanned by the tip 31, that is, a difference between an output voltage value obtained in the case of scanning the surface of the dielectric layer 33, that is, polymer and an output voltage value obtained in the case of contacting the tip 31 with the conductive layer 34 in the hole 38.

Therefore, the dielectric layer 33 is only needed to prevent a short circuit between the tip 31 of the probe and the conductive layer 34. As described above, the conductive layer 34 is formed of a material having a conductivity different from that of the dielectric layer 33, for example, metal or semiconductor. In particular, the conductive layer 34 is preferably formed of a material that does not oxidize easily.

An apparatus for recording and reading data according to a second embodiment of the present invention will be described with reference to FIG. 3B. In the case of the apparatus for recording and reading data illustrated in FIG. 3A, when a probe encounters a hole while scanning the surface of dielectric polymer, a short circuit occurs between a conductive layer under the polymer and the probe. At this time, the apparatus for recording and reading data reads voltage applied to an outer resistor, thereby reproducing data. On the other hand, in the case of the apparatus for recording and reading data shown in FIG. 3B, the step in which a short circuit between the conductive layer and the probe occurs is omitted and thus, the data read speed becomes fast.

Figure 3B:
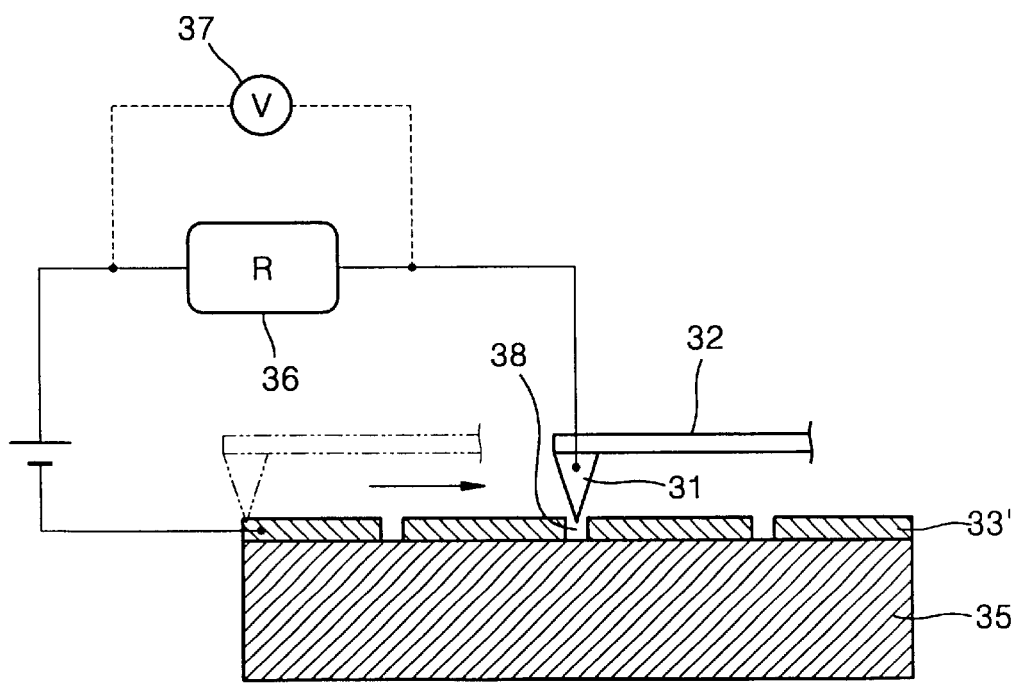
Figure 4A:
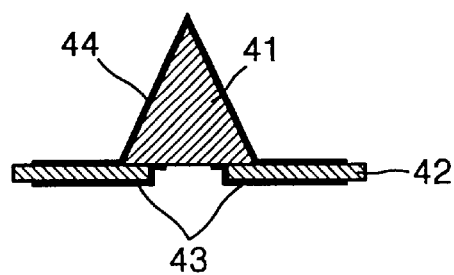
FIGS. 4A and 4B are diagrams illustrating a cantilever and a probe of an apparatus for recording and reading data according to the present invention.
Figure 4B:
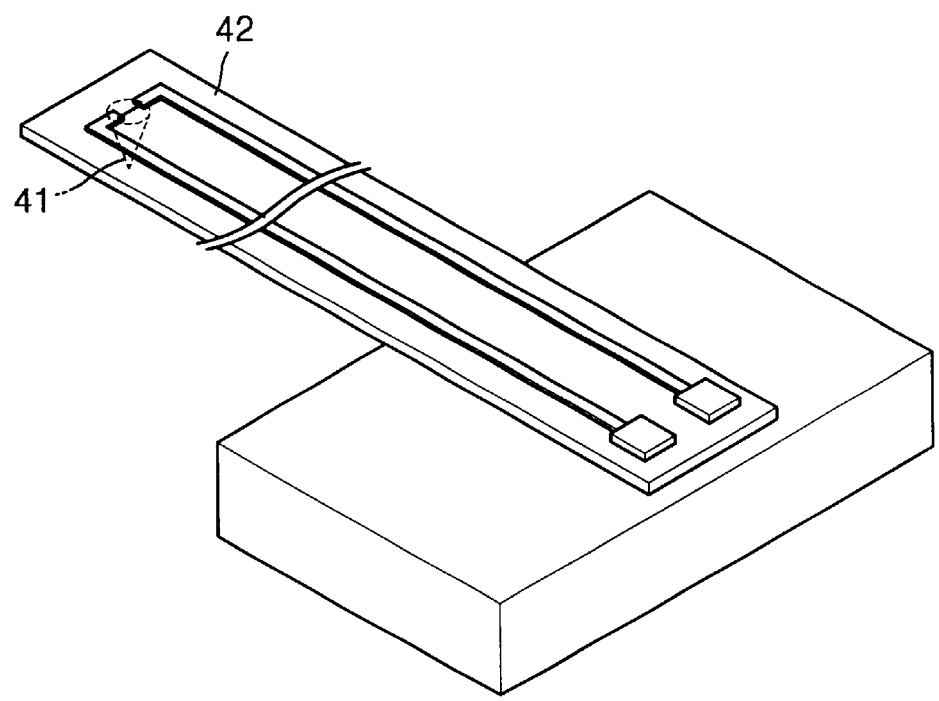
Figure 5A:
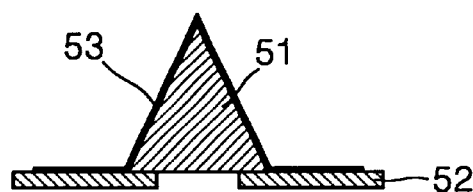
FIGS. 5A and 5B are diagrams illustrating another cantilever and another probe of an apparatus for recording and reading data according to the present invention.
Figure 5B:
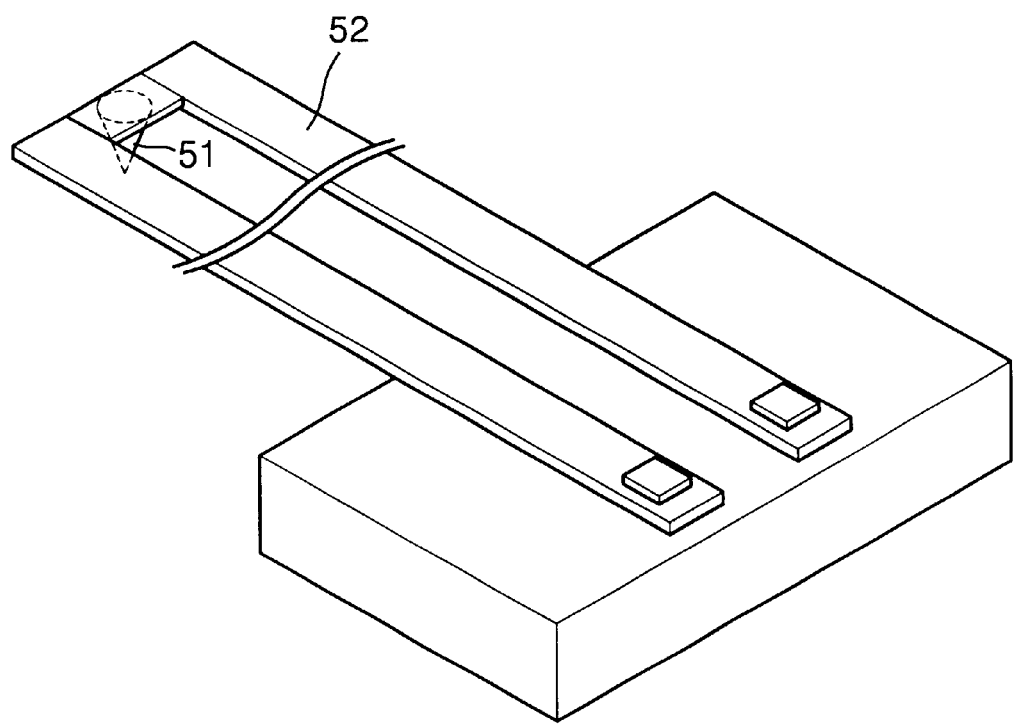

Referring to FIG. 3B, a conductive layer 33', for example, a conductive polymer layer is formed on the substrate 35. The apparatus for recording and reading data of FIG. 3A is different from that of FIG. 3B in that the former includes a dielectric polymer layer 33 and a conductive layer 34 inserted between the dielectric polymer layer 33 and the substrate 35.

The data recording and reading processes of the apparatus for recording and reading data according to the second embodiment of the present invention are as follows. The data recording process of the apparatus for recording and reading data of FIG. 3B is the same as that of the apparatus for recording and reading data of FIG. 3A. In other words, to record data on a data storage medium, current is applied to a metal electrode of the cantilever 32 and then, the silicon tip 31 having a relatively high resistance is heated. Desired portions of the conductive polymer layer 33' are heated using the heated silicon tip 31 and as a result the heated portions on the conductive polymer layer 33' melt. The hole 38 exposing the surface of the conductive layer 34 is formed at the melted portions on the conductive polymer layer 33'. The hole 38 is used as one data bit.

On the other hand, the apparatus for recording and reading data shown in FIGS. 3A and 3B have different data reading processes. In the case of the apparatus for recording and reading data of FIG. 3B, the tip 31 of the probe scans the surface of the substrate 35 and a short circuit occurs between the conductive polymer layer 33' and the tip 31 of the probe. As a result, a uniform output voltage value is recorded in the voltmeter 37. However, when the tip 31 of the probe scans the hole area 38, the output voltage falls to 0V or very close thereto. In the case of the apparatus for recording and reading data shown in FIG. 3B, only one layer, that is, the conductive polymer layer 33' is formed on the substrate 35. In addition, the tip 31 of the probe does not have to get into the hole 38 since all that is important is that the tip 31 is no longer in contact with the conductive polymer layer 33'. Thus, the data read speed becomes fast and abrasion of the tip 31 is reduced.

The probe of the apparatus for recording and reading data according to the present invention nearly has the same structure as typical probes. In other words, the probe of the present invention consists of the cantilever 32 and the tip 31. An electrode of two lines for applying current to the tip 31 and performing processes of recording and reading data is formed on the cantilever 32.

The structures of the cantilever and probe will be described with reference to FIGS. 4A, 4B, 5A and 5B. The cantilever 42 shown in FIG. 4B includes interconnections which are formed on one plate and thus, it is capable of shorting two lines at the same time. On the other hand, the cantilever 52 shown in FIG. 5B, itself, acts as interconnections for applying current to a tip and reading signals. Any cantilever that can apply current to the tip and read variations in current value between the tip and a storage medium can be used. Preferably, the cantilevers 42 and 52 are formed of SiN or a dielectric material having a low stress. Cone-shaped tips 41 and 51 are formed at the end of the probe in a direction perpendicular to the dielectric layer 33 shown in FIGS. 3A and 3B. Preferably, the tips 41 and 51 are formed of silicon or lightly-doped silicon. Each of the tips 41 and 51 is connected to a metal electrode for applying heat to the tip through each of the cantilevers 42 and 52 with two lines. Thus, it is possible to heat the tips 41 and 51 by applying current in the case of recording data and read the variations in the output voltage value between the tips 41 and 51 and a storage medium. The tips 41 and 51 are preferably coated with metal layers 44 and 53, respectively, in the case of reading data.

Figure 6:
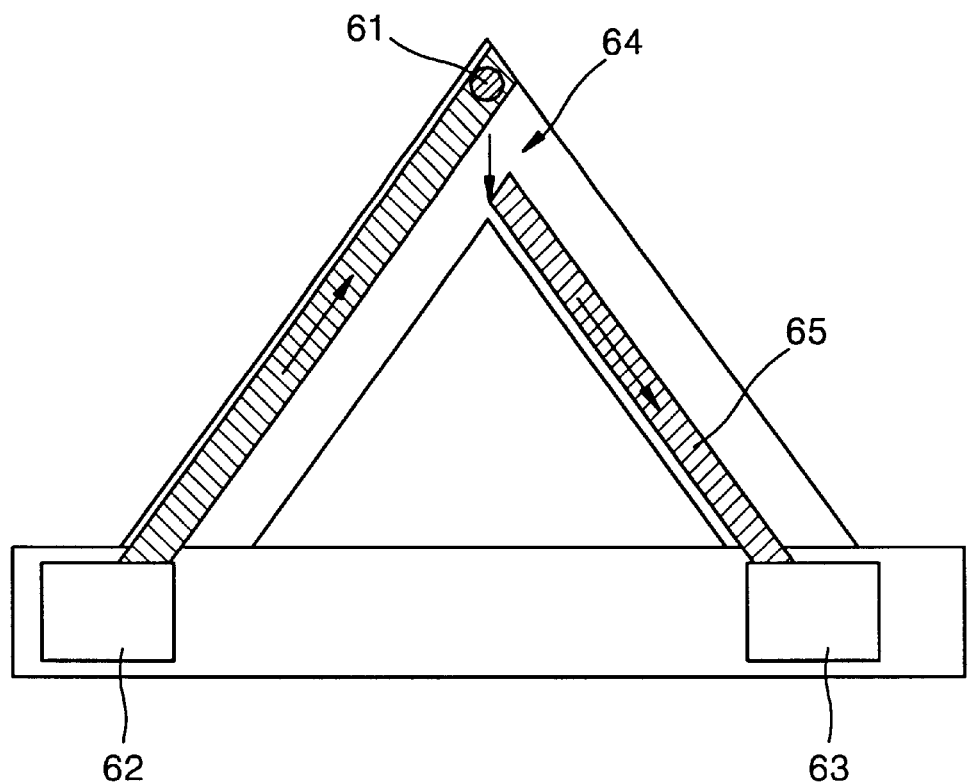
FIG. 6 is a diagram illustrating another probe of an apparatus for recording and reading data according to the present invention.

FIG. 6 is a diagram of another probe according to the present invention. In the probes shown in FIGS. 4A through 5B, an interconnection for heating and an interconnection for measuring contact resistance are separately manufactured. However, the probe of FIG. 6 is formed to carry out the two functions, that is, heating and measuring contact resistance, at the same time.

Referring to FIG. 6, a first contact pad 62 and a second contact pad 63 are connected to short lines of a cantilever and the line connected to the first contact pad 62 is in contact with a tip 61 of the probe. The line 65 connected to the second contact pad 63 is not in contact with the tip 61 of the probe.

The data recording and reading principles of an apparatus for recording and reading data having the probe shown in FIG. 6 are as follows. In recording data, current is applied through the first contact pad 62 and heat is generated at the tip 61 having a high resistance as current (represented by the arrow) passes there through into the second contact pad 63. Accordingly, it is possible to record a bit which is a data unit on a storage medium formed of polymer and placed on a substrate by melting the polymer with the heat. In the case of reading data, the variation of contact resistance between the polymer 33', 34 and the tip 61 is measured using only the first contact pad 62. Thus, in the case of the probe shown in FIG. 6, it is not necessary to prepare each separate line for different purposes such as data recording and data reading.

Figure 7A:
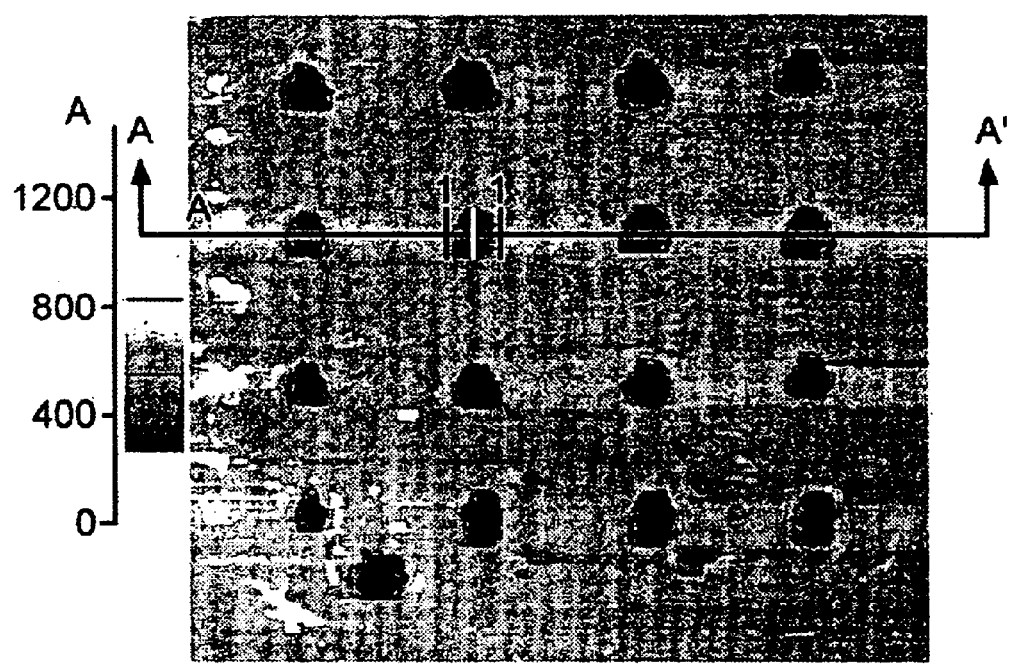
FIG. 7A is an atomic force microscopic (AFM) image showing the surface of a data storage medium according to the present invention after holes are formed on the data storage medium.
Figure 7B:
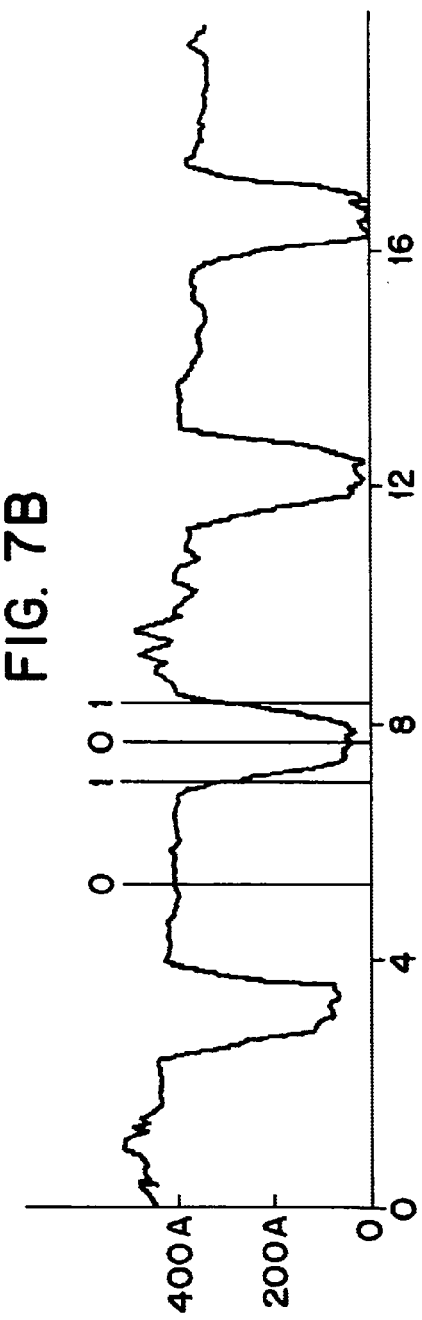
FIG. 7B is a graph showing the heights of portions on the surface of the data storage medium taken along the line A–A' of FIG. 7A.

FIG. 7A is an AFM image showing the surface of a data storage medium on which data bits are recorded using a typical probe and following the data storage mechanism of the present invention. FIG. 7B is a graph showing the heights of portions on the surface of the data storage medium of FIG. 7A. The AFM image shows a dielectric layer on which holes are formed. The size of the holes, that is, the size of data bits depends on the size of the tip of the probe. FIG. 7B is a graph showing the relative height of each portion on the dielectric layer, taken along the line A–A' of FIG. 7A. As shown in this graph, the holes are formed at predetermined positions on the dielectric layer.

Figure 8:
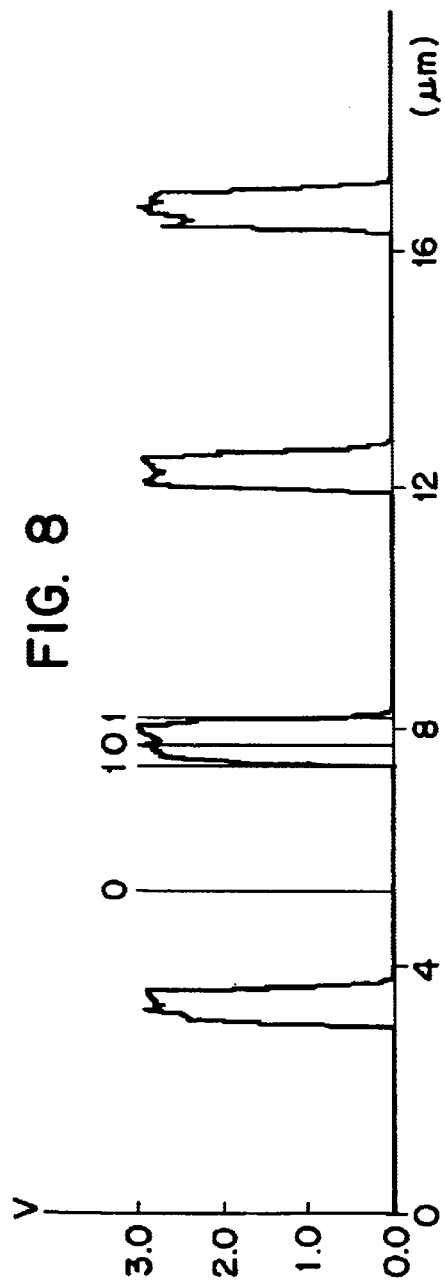
FIG. 8 is a graph showing output voltage values obtained by scanning the data storage medium shown in FIGS. 7A and 7B with the use of a probe.

FIG. 8 is a graph illustrating the results of applying the data reading mechanism of the present invention to the data storage medium shown in FIGS. 7A and 7B. Referring to FIG. 8, a voltage of 3V is applied. In a case where the probe touches a conductive layer in a hole, an output voltage of 3V is measured. In other words, it is possible to obtain an output voltage which is equal to the applied voltage without an amplification circuit and thus, it is possible to read minute data. The same results as described above with reference to FIG. 8 can be achieved by applying the data recording and reading mechanisms of the present invention to a typical probe.

Figure 9:
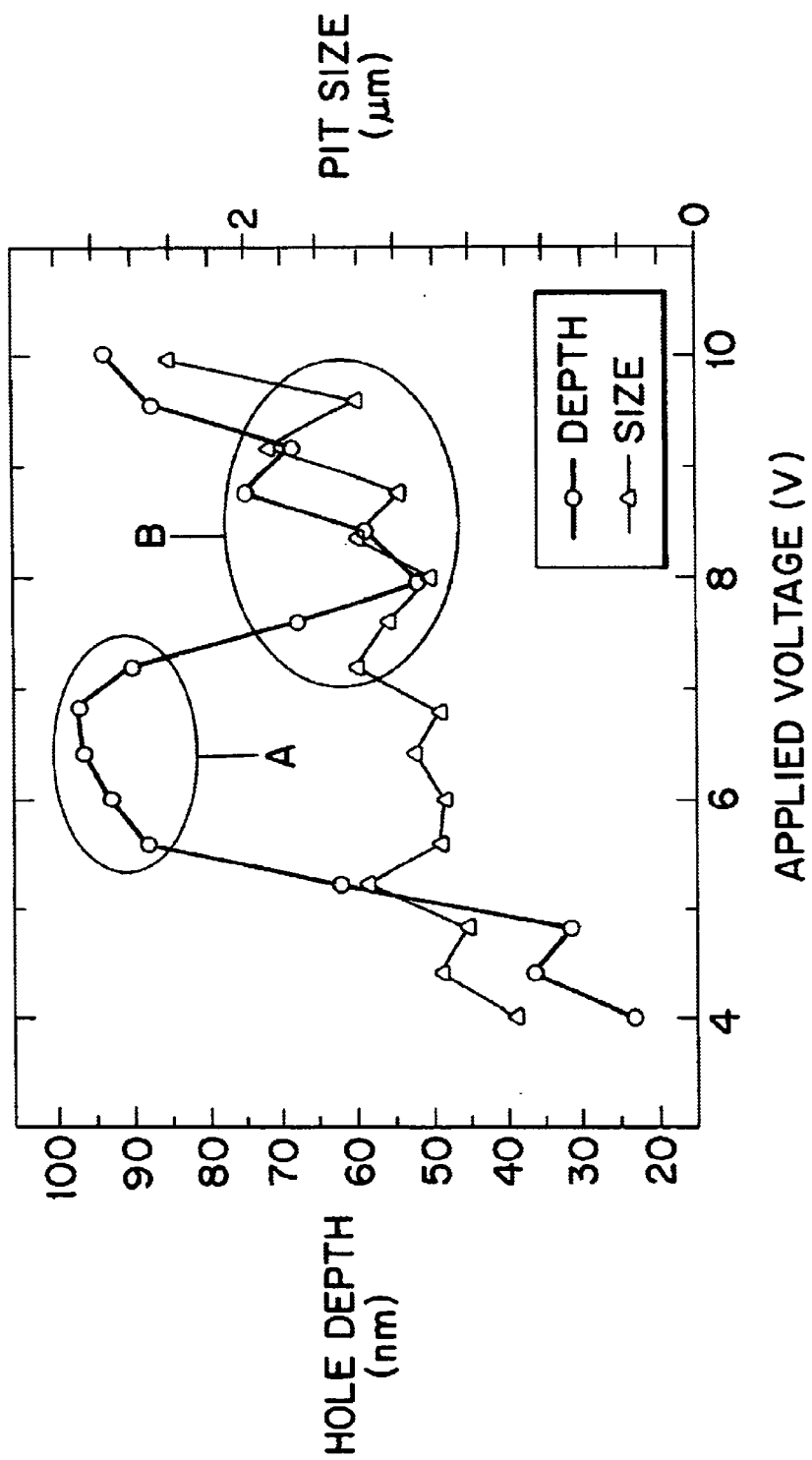
FIG. 9 is a graph showing the results of performing a rewritable test on an apparatus for recording and reading data according to the present invention.

FIG. 9 is a graph showing the results of performing a rewritable test on an apparatus for recording and reading data according to the present invention. In these graphs, the X-axis indicates voltage applied to a probe, the left Y-axis indicates the depth of the polymer and the right Y-axis indicates the size of a pit formed by the heated probe. Referring to FIG. 9, if heating performed by the probe continues, the size of the pit increases proportionately. However, the depth of the hole increases until the section A and decreases in the section B. After the section B, that is, if excess heat is applied to the polymer by the probe, the depth of polymer increases again. In other words, if the probe is made to be in contact with the pit again and voltage of the section B is applied to the pit and the pit is filled up. This means that data bits already recorded can be removed. Optimization of data removal and data re-recording depends on the surface energy or the adhesiveness of the material used for the data storage medium.

According to the present invention, it is possible to solve the three major problems with the prior art shown in FIGS. 1A through 2B. Firstly, in the prior art, a dielectric layer, that is, polymer, acts as a data bit in itself. On the other hand, in the present invention, the dielectric layer only acts as a passivation layer for preventing a short circuit occurring between the probe tip and metal or semiconductor and thus, the thickness of the polymer layer can be reduced to 40 nm or less. Accordingly, the size of a hole exposing the surface of the conductive layer (the metal or semiconductor layer) can be reduced significantly and the size of a data bit can be decreased, thereby enhancing the density of data recordable on a data storage medium.

Secondly, in the prior art, data can be read by sensing variations in temperature. On the other hand, in the present invention, data is read by sensing variations in the output voltage value caused by contact between the probe tip and the dielectric layer or the conductive layer, that is, sensing electric signals. Thus, the data read speed is only influenced by the oscillation frequency of the probe.

Finally, in the present invention, the output voltage can be measured as the ratio of a known resistance to contact resistance. Thus, in the present invention, it is possible to obtain a considerable amount of output voltage without adding an amplification circuit and it is also possible to obtain a signal-to-noise ratio even higher than that of the prior art. In addition, the present invention does not cause the problems of the prior art in which images becomes blurred depending on distribution of temperatures.

According to the present invention, it is possible to solve the problems concerning data retention, a superparamagnetic limit, a signal-to-noise ratio which have been at issue in developing data storage media with the use of a conventional SPM technique. Therefore, the reliability of a subminiature storage device can be significantly enhanced and the structure of measurement circuits used in the storage device can be simplified, thereby reducing the cost of production.

What is claimed is:

1. A system for recording and reading data comprising:
   a storage medium on which data is recorded; and
   a probe which is installed to face and scan the storage medium and is used for recording data on the storage medium and reading the data recorded on the storage medium,
   wherein the storage medium comprises:
      a conductive layer; and
      a dielectric layer which is formed on the conductive layer which is selectively removable to represent recorded data,
      wherein said system further comprises a circuit for reading the data, connected between said probe and said conductive layers that determines an output voltage value that varies depending on a portion of said storage medium being scanned by said probe.

2. The system for recording and reading data of claim 1, wherein holes are formed on predetermined portions of the dielectric layer so as to expose the top surface of the conductive layer.

3. The system for recording and reading data of claim 1, wherein the dielectric layer is formed of one among the group consisting of an organic material, a polymer, a wax and a liquid crystal, and the conductive layer is formed of one among the group consisting of metal and semiconductor.

4. The system for recording and reading data of claim 1, further comprising a substrate, wherein the substrate is one of a silicon substrate, a glass substrate, and a metal substrate.

5. The system for recording and reading data of claim 1, wherein the probe comprises a cantilever and a tip fixed on the cantilever.

6. The system for recording and reading data of claim 5, wherein the cantilever is formed of one among the group consisting of Si, SiN and dielectric material, the tip is formed of silicon and the surface of the tip is coated with a metal layer.

7. The system for recording and reading data of claim 5, wherein the probe operates in contact with the storage medium.

8. The system for recording and reading data of claim 5, wherein the probe further comprises a first contact pad and a second contact pad which are connected to short lines of the cantilever, the short line connected to the first contact pad is in contact with the probe tip and the short line connected to the second contact pad is not in contact with the probe tip.

9. A method for recording and reading data in an system for recording and reading data comprising a storage medium which comprises a conductive layer and a dielectric layer formed on the conductive layer; and a probe which is installed to face the storage medium and is used for recording data on the storage medium and reading the data recorded on the storage medium, comprising:

recording data by forming a hole on a predetermined portion of the dielectric layer to expose the surface of the conductive layer; and reading data by scanning the surface of the storage medium with the probe and sensing the variation of output voltage value caused by contact between the probe and the conductive layer.

10. The method for recording and reading data of claim 9, wherein the probe comprises a cantilever and a tip fixed on the cantilever.

11. The method for recording and reading data of claim 10, wherein the hole is formed by applying current to the probe to heat the tip and melting the dielectric layer with the heated tip.

12. The method for recording and reading data of claim 11, wherein variations in output voltage are caused by a short circuit between the tip and the surface of the conductive layer exposed by the hole in scanning the dielectric layer with the tip and are measured by a voltmeter included in the apparatus for recording and reading data.

13. The method for recording and reading data of claim 10, wherein the conductive layer is formed of one among metal and semiconductor and the cantilever is formed of one among Si, SiN and dielectric material.

14. The method for recording and reading data of claim 10, wherein the tip is formed of silicon and the surface of the tip is coated with a metal layer.

15. The method for recording and reading data of claim 10, wherein the probe operates in contact with the storage medium.

16. The method for recording and reading data of claim 10, wherein the probe further comprises a first contact pad and a second contact pad which are connected to short lines of the cantilever, the short line connected to the first contact pad is in contact with the probe tip and the short line connected to the second contact pad is not in contact with the probe tip.

17. A method for recording and reading data in an apparatus for recording and reading data comprising a storage medium which comprises a substrate and a conductive layer formed on the substrate; and a probe which is installed to face the storage medium and is used for recording data on the storage medium and reading the data recorded on the storage medium, comprising:

recording data by forming a hole on a predetermined portion of the substrate to exposed the surface on the conductive layer; and reading data by scanning the surface of the storage medium with the probe and sensing variations in the output value caused by contact between the probe and the storage medium.

18. The method for recording and reading data of claim 17, wherein the probe comprises a cantilever and a tip fixed on the cantilever.

19. The method for recording and reading data of claim 18, wherein the hole is formed by applying current to the probe to heat the tip and melting the dielectric layer with the heated tip.

20. The method for recording and reading data of claim 19, wherein, if the tip encounters the hole during scanning of the conductive layer, at which the tip and the conductive layer are no longer shorted by each other, output voltage is reduced to 0 V at the hole and variations in output voltage is measured by a voltmeter included in the apparatus for recording and reading data.

21. The method for recording and reading data of claim 17, wherein the conductive layer is formed of conductive polymer.

22. The method for recording and reading data of claim 17, wherein the probe further comprises a first contact pad and a second contact pad which are connected to short lines of the cantilever, the short line conected to the first contact pad is in contact with the probe tip and the short line connected to the second contact pad is not in contact with the probe tip.

23. A system for recording and reading data comprising:
a storage medium on which data is recorded; and
a probe which is installed to face the storage medium and is used for recording data on the storage medium and reading the data recorded on the storage medium,
wherein the storage medium comprises:
a substrate; and
a conductive layer which is formed on the substrate, the conductive layer being selectively removable to represent recorded data.

24. A system for recording and reading data comprising:
a storage medium on which data is recorded; and
a probe which is installed to face the storage medium and is used for recording data on the storage medium and reading the data recorded on the storage medium,
wherein the storage medium comprises:
a conductive layer; and
a data storage layer which is selectively removable to represent recorded data, said data storage layer comprising one of said conductive layer or a dielectric layer, said recorded data being readable by said probe by the appearance or absence of a short circuit between said probe and said conductive layer due to the selectively removed storage layer.

* * * * *